United States Patent
Lambert et al.

(10) Patent No.: US 8,617,306 B2
(45) Date of Patent: Dec. 31, 2013

(54) SILICA-ALUMINA MIXED OXIDE COMPOSITIONS

(75) Inventors: Patrick M. Lambert, Rochester, NY (US); Joseph F. Bringley, Rochester, NY (US)

(73) Assignee: Transparent Materials, LLC, Rochester, NY (US)

( * ) Notice: Subject to any disclaimer, the term of this patent is extended or adjusted under 35 U.S.C. 154(b) by 83 days.

(21) Appl. No.: 13/135,061

(22) Filed: Jun. 24, 2011

(65) Prior Publication Data

US 2012/0004342 A1   Jan. 5, 2012

Related U.S. Application Data

(60) Provisional application No. 61/359,894, filed on Jun. 30, 2010.

(51) Int. Cl.
*C04B 14/04* (2006.01)
(52) U.S. Cl.
USPC ........... 106/483; 106/481; 106/482; 106/490; 523/115; 423/327.1; 423/327.2
(58) Field of Classification Search
USPC ........ 523/115; 106/481–483, 490; 423/327.1, 423/327.2
See application file for complete search history.

(56) References Cited

U.S. PATENT DOCUMENTS

| 4,217,264 | A | * | 8/1980 | Mabie et al. | 523/218 |
| 4,503,169 | A | * | 3/1985 | Randklev | 523/117 |
| 4,764,497 | A | * | 8/1988 | Yuasa et al. | 502/235 |
| 6,048,577 | A | * | 4/2000 | Garg | 427/215 |
| 7,030,049 | B2 | * | 4/2006 | Rusin et al. | 501/133 |
| 7,160,528 | B2 | * | 1/2007 | Rusin | 423/277 |
| 7,335,250 | B2 | * | 2/2008 | Burtscher et al. | 106/35 |
| 7,879,743 | B2 | * | 2/2011 | Bringley et al. | 442/80 |
| 2005/0089582 | A1 | * | 4/2005 | Zapf et al. | 424/684 |
| 2009/0081440 | A1 | * | 3/2009 | Bringley et al. | 428/221 |
| 2009/0286901 | A1 | * | 11/2009 | Vijverberg et al. | 523/206 |

OTHER PUBLICATIONS

Bodisova et al., The Influence of the Preferred Orientation of Boehmite Crystallites on alpha-Al2O3 Crystallization, 2005, Ceramics, 49, 34-39.*

* cited by examiner

*Primary Examiner* — James J Seidleck
*Assistant Examiner* — Peter A Salamon

(57) ABSTRACT

The present invention relates to hetero-coagulated silica-alumina mixed oxide compositions that have a sharp refractive index and narrow refractive index dispersion between about 1.46 and 1.60.

21 Claims, No Drawings

SILICA-ALUMINA MIXED OXIDE COMPOSITIONS

CROSS REFERENCE TO RELATED APPLICATIONS

Priority is claimed to: U.S. Provisional Patent Application Ser. No. 61/359,894 by P. Lambert et al., entitled "MIXED OXIDE COMPOSITIONS", filed on Jun. 30, 2010, the disclosure of which is incorporated herein by reference.

FIELD OF THE INVENTION

The present invention relates to silica-alumina mixed oxide compositions that have a sharp refractive index and narrow refractive index dispersion between about 1.46 and 1.60.

BACKGROUND OF THE INVENTION

The science of nanotechnology is advancing rapidly, largely as a result of the enormous number of investigators and generous funding, however, examples of practical and affordable implementations of nanotechnology are not as prevalent. There are several challenges uniquely linked to nanomaterials and two critical issues stand out. First, manufacturing methods are required to produce nanomaterials reproducibly, with narrow particle size distributions, at volume, and at appropriate cost points. Second, manufacturing methods are required to produce uniformly surface functionalized nanomaterials that allows them to be integrated into the desired matrix with the retention of performance. The dimensional attributes of nanoparticles that offer such remarkable performance also bear, at times, overwhelming handling difficulties. The inability to successfully meet these challenges has crippled many efforts to bring nanomaterial opportunities to fruition.

In the biomedical field, nanotechnology has begun to deliver on its extraordinary potential; for example, nanomaterials have been shown to improve bone integration and increase the healing rate after surgery. In the context of dental applications, polymer nanocomposites dramatically enhance the strength, hardness, and durability of dental restoratives, and facilitate a wide array of commercial applications that emulate the remarkable properties of dental hard tissues (enamel and dentin). There are appreciable challenges in the manufacture and integration of such materials. Under the best circumstances, traditional solvent-based or sol-gel paths realize modest yields, with the environmental liability of waste hydrocarbons. Not surprisingly, the incorporation of these high surface area particles into the preferred monomers and polymers is not trivial; the mismatch in interfacial energy between nanomaterials and biomedical polymers often preclude their integration into these materials.

In applications where nanoparticles and/or micron sized particles are used together with polymers, prepolymers, oligomers and monomers and other hardenable or nonhardenable resins (hereafter referred to collectively as resins), the degree of dispersion of the particles is particularly important with respect to the performance attributes of the final article being produced from the dispersion. Poorly dispersed particles will result in inhomogeneities within the resin and a concomitant degradation in performance attributes. In resins that are polymerized, hardened or cured via electromagnetic radiation, for example, ultraviolet, visible, electron beam or x-radiation, the homogeneity is of particular importance since scattering of the incident radiation by the particles may limit absorption and reduce the cure rate and/or the cure depth of the article. In this same context, the presence of nano sized and/or micron sized particles may opacify the article and prevent penetration of the curing radiation. It is therefore of interest to prepare particle compositions that have the same refractive index as the resin in which they are dispersed. Because the particles and resin have the same refractive index, the incident radiation is not highly scattered and such dispersions appear transparent or translucent. This increases the penetration depth of the curing radiation and increases the cure rate and cure depth. Still further, if the refractive index of the particles is designed to have the same refractive index of the resin after curing (since the refractive index of most resins changes slightly upon curing) the final article may be transparent or translucent and have desirable aesthetic qualities. Still further, transparent or translucent resins that have a high loading of hard and strong inorganic particulates have a variety of uses in optical coatings and composites, often having superior mechanical strength and scratch resistance compared to the unloaded resin.

There is a need therefore to produce particulates or fillers in which the refractive index can be precisely controlled so that they may be index matched to a variety of resins and so that transparent or translucent articles may be produced with high performance attributes.

U.S. Pat. No. 4,217,264 to Mabie et al., discloses a microporous filler for dental composite resin restorations which gives greatly improved finishability, system nontoxicity and x-ray opacification. These fillers are prepared from frits obtained by the low temperature calcination of gelled inorganic polymers followed by a pulsed high heat treatment. Mabie describes microporous glassy fillers that have a median refractive index between about 1.51 and about 1.64, the microporous glassy filler comprising a gelled, calcined sol comprised of refractory inorganic oxides including silica and alumina, and at least one nontoxic x-ray opacifying agent selected from the group consisting of zirconium, hafnium, tantalum and tin oxides. Mabie describes metal oxide mixtures that share the same refractive index as the polymers and/or monomers used in dental restoratives. There is a problem, however, in that such mixed oxides have a high surface area and are brittle, and further the mixed oxides are nonhomogeneous and have a broad refractive index dispersion and do not provide adequate transparency.

U.S. Pat. No. 4,503,169 to Randklev discloses radiopaque, low visual opacity, non-vitreous microparticles that consist primarily of silica and zirconia. Randklev discloses (column 5, line 52) that "other metal oxides which may not themselves provide sufficient radiopacity can, if desired, be included in the microparticles of the present invention". However, the materials of Randklev have a low visual transparency and further Randklev does not describe methods for achieving high visual transparency. Still further, the compositions described by Randklev require one or more pulsed heat treatments (column 6, lines 33-65) in order to remove organic impurities and to convert the precursor materials to a mixed oxide composition. It would be advantageous to produce mixed oxides that are free of organic impurities and do not require expensive heat treatments to form the mixed oxides.

U.S. Pat. No. 4,764,497 to Yuassa et al. discloses an amorphous, spherical inorganic compound with a particle size of 0.1 to 1.0 um that consist of a mixture of silica-zirconia, silica-titania and silica-alumina mixed oxides, among others. The silica-alumina mixed oxides are prepared by reacting an alkoxysilane with an organo-alumina complex in organic solvent in the presence of a small amount of water to catalyse the reaction. There is a problem, however, in that the reactivity of the two reagents is vastly different and homogeneous mixed oxides are difficult to prepare. The highest alumina loading achieved is just 6.3 mole % alumina and the corresponding refractive index is only 1.46-1.47, see examples 3, 53-55 and 58-60. Further, formation of the mixed oxide by this method requires processing temperatures of about 1000° C.

U.S. Pat. No. 7,030,049 to Rusin et al. discloses non vitreous microparticles prepared by a sol-gel method in which an aqueous or organic dispersion or sol of amorphous silicon oxide is mixed with an aqueous or organic dispersion, sol, or solution of a radiopacifying metal oxide, or precursor organic or inorganic compound, the microparticles being substantially free of crystalline microregions or inhomogeneities detectable via powder x-ray diffraction. In column 28, Rusin discloses mixed oxides comprising $SiO_2$—$B_2O_3$—$La_2O_3$—$Al_2O_3$ (fillers c-e) and $SiO_2$—$La_2O_3$—$Al_2O_3$ (fillers l-m). There is a problem, however, in that the fillers of Rusin et al. inevitably contain high amounts of heavy metal radiopacifying agents and/or melt flux reagents such as boron oxide that decrease the hardness and strength of the mixed oxide and further add to its cost. The melt flux reagents lead to a sintering of the mixed oxide and therefore a high amount of energy is required to reduce the particle size of the mixed oxide.

U.S. Pat. No. 7,160,528 to Rusin et al. discloses a melt derived filler comprising 5-25% by weight aluminum oxide, 10-3 5% by weight boron oxide, 15-50% by weight lanthanum oxide, and 20-50% by weight silicon oxide. There is a problem, however, in that melt derived fillers require high temperature processing and energy intensive diminution of the glass formed.

U.S. Pat. No. 7,335,250 to Burtscher et al. discloses a dental composite comprising at least one nanoparticulate mixed oxide (a) of $SiO_2$ with x-ray opaque metal oxides of one or more elements selected from the group consisting of Y, La, Ta, Ce, Pr, Nd, Sm, Eu, Gd, Tb, Dy, Ho, Er, Tm, Yb, Lu which has been prepared by flame spraying and wherein the mixed oxides have at least one of the following features: a) an amorphous structure, b) a homogeneous element distribution, c) a very low organic content, d) an x-ray opacity which can be varied, e) an index of refraction which can be varied, and f) a spherical particle shape. The patent does not mention silica-alumina mixed oxides.

Problem to be Solved

There is a need to produce mixed oxides that have a low overall density and can be mixed into polymers to form composites at high volume fraction filler. There is a need to produce binary silica-alumina mixed oxides that are highly homogeneous and have a refractive index that can be continuously modulated between about 1.46 to about 1.60. There is a need to produce pure silica-alumina mixed oxides that are free of radiopacifying agents and/or melt fluxes. Manufacturing methods are needed that produce silica-alumina mixed oxides at low cost, from aqueous solution and without the need for hydrocarbon solvents, and at low processing temperatures that do not require high energy grinding processes to reduce the particle size of the mixed oxide.

SUMMARY OF THE INVENTION

The present invention relates to a composition comprising a hetero-coagulated silica-alumina mixed oxide particle comprising at least one silica colloid and at least one alumina or alumina precursor, wherein the alumina or alumina precursor has an average mean primary particle diameter of less than 50 nm and a composition comprising a hetero-coagulated silica-alumina mixed oxide particle comprising at least one silica colloid and at least one alumina or alumina precursor, wherein the alumina or alumina precursor has an average mean primary particle diameter of less than 50 nm in a matrix. The invention also relates to a method of making a hetero-coagulated silica-alumina mixed oxide particle comprising simultaneously adding at least one silica colloid to at least one alumina or alumina precursor, wherein the alumina or alumina precursor has an average mean primary particle diameter of less than 50 nm, in a high shear mixing zone.

Advantageous Effect of the Invention

The present invention includes several advantages, not all of which are incorporated in a single embodiment. The invention provides silica-alumina mixed oxides that have a refractive index that can be continuously modulated between about 1.46 and 1.60; the composition are highly homogeneous and have a "sharp" refractive index dispersion. When dispersed in a resin of the same refractive index, the silica-alumina compositions provide a high transparency even at high loadings with the resin. This increases the curing-depth, strength and transparency of the article produced and allows for applications as optical components. The invention provides for the preparation of mixed oxides at relatively low processing temperatures and also provides a means for functionalizing the surfaces of the mixed oxides so that they may be integrated into resins using simple methods.

DETAILED DESCRIPTION OF THE INVENTION

The present invention relates to silica-alumina mixed oxide compositions that have a sharp refractive index and narrow refractive index dispersion between about 1.46 and 1.60, most preferably when dispersed in a fluid of substantially the same refractive index.

Terms and Definitions.

Primary particle size, as used herein, refers to the mean particle diameter of the colloidal precursor particles, or assemblies of colloidal precursor particles.

Secondary particle size as used herein, refers to the mean particle diameter of the mixed oxide particles after drying and/or subsequent thermal processing.

Surface functionalized particles as used herein refers to particles functionalized with inorganic, polymeric or molecular species.

Surface modified particles as used herein refers to surface functionalized particles which have been further reacted with other compounds bearing functional groups to produce a complex particle bearing a compound or compounds on its surface through the surface functionalization.

The mixed oxides of the invention are prepared from silica, alumina and alumina precursors. It is preferred that both the silica and alumina are selected from aqueous dispersible particulate sources, often called colloids. Specific examples include colloidal, precipitated or fumed silica having the general formula $SiO_2$, aluminas such as $Al_2O_3$ and its polymorphs, and AlOOH (also known as boehmite). Other possible sources of alumina contemplated are hydrous aluminas and $Al(OH)_3$. The preferred silica particles have a mean primary particle size diameter of less than 200 nm and more preferably between about 1 and 100 nm. Preferred silica's are aqueous colloidal dispersions manufactured by Nalco Chemical Company or Nissan Chemicals. The preferred alumina particles are $Al_2O_3$ and boehmite having a mean primary particle size diameter of less than 200 nm and more preferably between about 1 and 100 nm, more preferably between 1 and 50 nm, and most preferably less than 25 nm.

In the practice of the invention, the silica and alumina sources are mixed together in a suitable solvent or medium. The mixing can be accomplished using a prop-like mechanical mixer, planetary mixer, static mixer, magnetic stirrer or other means of mixing. It is preferred that the colloids are mixed homogeneously on a scale smaller than about one micron. To accomplish homogeneous mixing, it is preferred that the silica and alumina sources are mixed in a high shear mixer. The high shear mixing zone may be provided by a propeller-like mixer, a static mixer, in-line mixers, dispersators, or other high shear mixing apparatus. The mixing efficiency of the apparatus is dependent upon the type of mixing method chosen and the precise geometry and design of the mixer. For propeller-like mixers, the mixing efficiency may be approximated by the turnover rate, where the turnover rate is the stir rate (rev/sec.) times the turnover volume (mL/rev)) divided by the aqueous volume. For in-line or static mixers, the mixing efficiency may be approximated by multiplying the sum of the addition rates of the colloidal dispersions by the turnover volume of the mixer. In each case, the mixing efficiency has units of turnovers/sec. It is preferred that the mixing efficiency be greater than about 0.10 turnovers/sec. and more preferably greater than 1 turnover/sec. Complete mixing of the two solutions is preferably accomplished in less than about 10 seconds, and is more preferably accomplished substantially instantaneously.

In a preferred embodiment, the invention provides a composition comprising silica and alumina that is prepared by simultaneously adding a silica colloid to an alumina colloid or alumina precursor, with a mean particle diameter not more than 50 nm, into a high shear mixing zone. The method may further comprise drying the mixture to obtain a powder and/or thermally treating the dried powder. The silica-alumina mixed oxide, both before and after drying and/or thermal processing has an index of refraction between 1.46 and 1.60, and has a high transparency when dispersed in a fluid of substantially the same refractive index.

It is preferred that the silica and alumina sources are brought together simultaneously into a high shear mixer since, by doing so, they may spontaneously assemble by electrostatic forces into a colloidally stable aqueous mixture that is highly homogeneous. Silica colloids commonly contain negatively charged particles at a pH above about 2.0, whereas alumina colloids commonly contain positively charged particles. Upon mixing the two colloids, the colloid particles will associate or stick together by charge-charge attraction. These homogeneous, simultaneously formed particles are referred to as hetero-coagulated particles. If the colloidal dispersions are not mixed instantaneously in a high shear mixing zone, aggregation may occur, causing a steep increase in the viscosity of the mixture. The increase in viscosity renders the dispersion more difficult to mix which leads to further aggregation and a catastrophic breakdown in the homogeneity of the mixture. Methods for making homogeneous colloidal dispersions by simultaneous addition of colloids into a high shear mixer are described in PCT WO2005/009603 A1 to Bringley and are incorporated herein by reference.

The hetero-coagulated silica-alumina mixed oxide particles are preferably stable aqueous colloidal mixtures. A stable aqueous colloidal mixture is one that does not settle or separate from aqueous dispersion for a period of at least one month or more. Colloidal stability refers to the ability of particles to remain stable in suspension (not to settle or separate from the dispersion). The colloidal stability of dispersions may be determined by a number of methods. The dispersion may be placed in a tall, narrow glass container and the settling rate monitored visually over a period of months. A more quantitative approach is to measure the average particle size diameter of the particles in the dispersion. Unstable colloids show a tendency to aggregate or agglomerate, that is, particles begin to stick to one another. This aggregation is observed as an increase in the average particle diameter of the particles in the dispersion.

It is preferred that the hetero-coagulated mixed-oxide particles, in aqueous dispersion, are a stable dispersion in which the size distribution of the aggregated particles can be controlled. It is preferred that the aggregates have a mean particle diameter of less than 25 microns, more preferably less than 10 microns and most preferably less than 2 microns. These larger aggregates contain a homogeneous mixture of primary silica and alumina or alumina precursor particles. The particle size (s) of the colloidal particles may be characterized by a number of methods, or combination of methods, including coulter methods, light scattering methods, sedimentation methods, optical microscopy and electron microscopy. Light scattering methods may sample $10^9$ or more particles and are capable of giving excellent colloidal particle statistics. Light scattering methods may be used to give the percentage of particles existing within a given interval of diameter or size, for example, 90% of the particles are below a given value. Light scattering methods can be used to obtain information regarding mean particle size diameter, the mean number distribution of particles, the mean volume distribution of particles, standard deviation of the distribution(s) and the distribution width for the particles.

It is preferred that the silica and alumina colloids of the invention are dispersed intimately amongst each other and are homogeneous on a nanoscale. Such colloidally stable aqueous mixtures, after thermal processing, may provide silica-alumina mixed oxides that have a remarkably sharp refractive index dispersion. The term "sharp refractive index dispersion", as used herein, refers to the distribution of refractive indices from particle-to-particle. Materials prepared by the thermal treatment of solids at temperatures below their melting point are often inhomogeneous due to the fact that the mobility or diffusion of solids is very low at these temperatures. This gives rise to variations in composition and hence the refractive index, from particle-to-particle, and poorly transparent composites. The present invention overcomes this problem by intimately mixing all components on a nanoscale, much smaller than the wavelength of visible light (about 400-700 nm). Therefore, on the scale of visible light, there are little or no compositional variations from particle-to-particle. This produces particulate mixed-oxides with a "sharp" refractive index. It is preferred that greater than 90 volume % of the particles have a refractive index within ±0.01; it is more preferred that greater than 90 volume % of the particles have a refractive index within ±0.005, and it is most preferred that greater than 90 volume % of the particles have a refractive index within ±0.003. When placed or dispersed within a fluid or other matrix of approximately the same refractive index, these white powders may essentially disappear to form clear, colorless composites. This effect is highly desirable.

In the practice of the invention, the silica and alumina precursor materials are first assembled in aqueous, or other, solvent medium. The preferred medium is water.

The compositions of the invention, after assembly, are dried and thermally processed at a given temperature to produce a homogeneous silica-alumina mixed oxide aggregate of the colloidal or soluble precursor materials. The drying and/or thermal processing may be accomplished in a separate step, or combined into a single step. Drying may be accomplished by any convenient means including drying the dispersion in a conventional oven, spray-drying, rotary drying, filtration, freeze-drying, or the like. The dried heterocoagulated silica-alumina mixed oxide aggregates are thermally processed at a given temperature. The thermal processing step serves to remove any residual water, may further increase the homogeneity of the mixture, decreases the apparent surface area and aids in the crystallization of the components (if desirable). Thermal processing temperatures can be used to affect various parameters, such as, for example, hardness, phase formations, and surface area. The thermal processing temperature may vary from about 0 to 1100° C., dependent upon the application. It is preferred that the thermal processing temperature be below about 1200° C., more preferably below about 300° C. and most preferably below about 125° C. During the thermal processing step, the particle components may aggregate or fuse together to form strong agglomerates. This reduces the surface area of the particles and increases their strength. It is preferred that the heterocoagulated silica-alumina mixed oxide agglomerates after thermal processing have a surface area between about 5-200 m$^2$/g and it is more preferred that the surface area is controlled to from about 1-50 m$^2$/g. The reduction in surface area facilitates the integration of the compositions of the invention into polymers, monomers, composites, and other formulations, and also increases the mechanical strength of the composites made therefrom.

In order to facilitate the integration of the compositions of the invention into polymers, monomers, composites or other formulations, it may be necessary to modify the surfaces of the particle with surface agents, for example, surfactants, coating aids, coupling agents, or the like. It is preferred that the silica-alumina mixed oxide particles have their surfaces modified by silane coupling agents, or hydrolyzed precursors of silane coupling agents having the general formula:

$$R_a R'_b Si(OR'')_{4-(a+b)},$$

where a and b are integers from 1 to 3, (a+b) is less than or equal to 3, R and R' are organic groups having from 1-30 carbon atoms and R" is H, or an organic group having from 1 to 6 carbon atoms.

Alternatively, the silane coupling agent may have the general formula:

$$R_a Si(X)_{4-a},$$

where a and R are as defined above and X is a halogen, Cl, Br or I.

Silane coupling agents are well known as dispersion aids, as interfacial materials and facilitate the integration of the inventive materials into formulations, paints, polymers, composites, and the like. Specific examples of silane coupling agents useful for practice of the invention include, but are not limited to, 3-mercaptopropyl(trimethoxy)silane, 3-mercaptopropylmethyl(diethoxy)silane, methacryloxypropyl(trimethoxy)silane, 2-[methoxy(polyethyleneoxy)propyl](trichloro)silane, 2-[methoxy(polyethyleneoxy)propyl](trimethoxy)silane, octyl(trimethoxy)silane, octadecyl(trimethoxy)silane, 3-isocyanatopropyldimethylchlorosilane, 3-isocyanatopropyl(triethoxy)silane, Bis(2-hydroxyethyl)-3-aminopropyltriethoxysilane, aminopropylsilanetriol, 3-aminopropyl(triethoxy)silane, 3-aminopropyl(trimethoxy)silane, N-(2-aminoethyl)-3-aminopropylsilanetriol, N-(2-aminoethyl)-3-aminopropyl(trimethoxy)silane, N-(2-aminoethyl)-3-aminopropylmethyldimethoxysilane, isopropyl(trimethoxy)silane, (3-glycidoxypropyl)methyldimethoxysilane, and tetradecyldimethyl(3-trimethoxysilylpropyl)ammonium chloride, (3-trimethoxysilylpropyl)diethylenetriamine and octadecyldimethyl(3-ammonium)propyl(trimethoxy)silane.

To initiate the surface functionalization reaction, the silica-alumina mixed oxide particles and the surface agent are mixed together in a high shear mixing zone within a dispersion medium. It is preferred that the dispersion medium is water, but other solvents or liquids may also be used. The particles may be heated for a time to complete reaction of the surface agent with the particle surfaces and the water or solvent removed by vacuum drying, oven drying, spray-drying, freeze-drying or other drying method.

In another embodiment, the silica-alumina mixed oxide particles are dispersed within a matrix. The matrix may comprise at least one fluid, polymer, oligomer, monomer or combinations thereof. The invention provides silica-alumina mixed oxides having a refractive index between 1.46 and 1.60 that have a high transparency when dispersed in a fluid of the same refractive index. The refractive range between 1.46 and 1.60 is desirable because most resins have a refractive index within this range. It is desirable to produce filler materials whose refractive indices are as closely matched as possible to the resin in which they are dispersed. Index matched fillers do not scatter light strongly and therefore appear transparent or translucent within the matching resin matrix. The index of refraction of the silica-alumina mixed oxides of the invention can be adjusted by changing the weight ratio of silica and alumina as is required for a given resin. The silica and alumina weight ratios for a given aim refractive index can be calculated as is described in the Examples.

It is desirable to match the refractive index to the matrix, for example, resin, to within about 0.01 units, it is preferable to match the refractive index to with about 0.005 units and it is more preferable to match the refractive index to within about 0.002 units. In some cases, the refractive index of the matrix, for example, resin, may change slightly upon hardening, curing, or after polymerization. In this case, it is most desirable to match the refractive index of the filler to that of the cured resin, so that the final composite, article or coating will have the highest possible transparency. While the silica-alumina mixed oxides of the invention can be index matched to any resin within the range of 1.46-1.60, silica-alumina mixed oxide with a refractive index between about 1.48-1.55 are preferred. This range is preferred because it is the range of refractive indices that encompass most light curable resins. The inventive particles are especially suitable for application in visible, UV, x-ray and electron beam curable resins (hereafter collectively referred to as light curable resins), because they allow the curing radiation to penetrate the article, coating or composite.

The invention provides silica-alumina mixed oxides that have a high transparency when dispersed in a fluid of substantially the same refractive index. This provides the maximum transparency when, in practice, the mixed oxides are dispersed within a resin and the resin cured to produce an article. The transparency can be measured in many different ways. In a simple form, transparency refers to the ability to see through an object (such as the case for a window) and to recognize and discern objects on the other side. The transparency of articles prepared using the inventive compositions will be dependent upon the precise index match, the loading of the compositions within the resin, and the thickness of the article produced. In a preferred embodiment, when the silica-alumina mixed oxide particles are dispersed in a fluid of substantially the same refractive index at a weight fraction of at least 25%, the visible light transmission of a 1.5 millimeter thickness is greater than 40.0%. In a more preferred embodiment, the silica-alumina mixed oxide particles are dispersed in a fluid of substantially the same refractive index at a weight fraction of at least 25%, the visible light transmission of a 1.5 millimeter thickness is greater than 70.0%.

In the application of the invention, the silica-alumina mixed oxides are dispersed within a resin matrix. The inventive compositions may be dispersed within the resin at a loading of up to about 80% by weight, dependent upon the desired properties. It is preferred that the resin is a thermally or light curable resin. In the practice of the invention, useful examples of resins are acrylate-functional materials, methacrylate-functional materials, epoxy-functional materials, vinyl-functional materials, and mixtures thereof. Typically, the hardenable resin is made from one or more matrix forming oligomer, monomer, polymer, or blend thereof. Also useful are urethanes, fluoropolymers, siloxanes and latex polymers.

In certain embodiments, the inventive materials are used in dental applications or in orthopedic or other in vivo applications. Polymerizable materials suitable for use in these applications include hardenable organic materials having sufficient strength, hydrolytic stability, and nontoxicity to render them suitable for use in the oral or in vivo environment. Examples of such materials include acrylates, methacrylates, urethanes, carbamoylisocyanurates, epoxies, and mixtures and derivatives thereof. One class of preferred hardenable materials includes materials having polymerizable components with free radically active functional groups. Examples of such materials include monomers having one or more ethylenically unsaturated group, oligomers having one or more ethylenically unsaturated group, polymers having one or more ethylenically unsaturated group, and combinations thereof.

In the class of hardenable resins having free radically active functional groups, suitable polymerizable components for use in the invention contain at least one ethylenically unsaturated bond, and are capable of undergoing addition polymerization. Such free radically ethylenically unsaturated compounds include, for example, mono-, di- or poly-(meth)acrylates (i.e., acrylates and methacrylates) such as, methyl (meth)acrylate, ethyl acrylate, isopropyl methacrylate, n-hexyl acrylate, stearyl acrylate, allyl acrylate, glycerol triacrylate, ethyleneglycol diacrylate, diethyleneglycol diacrylate, triethyleneglycol dimethacrylate, 1,3-propanediol di(meth)acrylate, trimethylolpropane triacrylate, 1,2,4-butanetriol trimethacrylate, 1,4-cyclohexanediol diacrylate, pentaerythritol tetra(meth)acrylate, sorbitol hexacrylate, tetrahydrofurfuryl (meth)acrylate, bis[1-(2-acryloxy)]-p-ethoxyphenyldimethylmethane, bis[1-(3-acryloxy-2-hydroxy)]-p-propoxyphenyldimethylmethane, ethoxylated bisphenol A di(meth)acrylate, and trishydroxyethyl-isocyanurate trimethacrylate; (meth)acrylamides (i.e., acrylamides and methacrylamides) such as (meth)acrylamide, methylene bis-(meth)acrylamide, and diacetone (meth)acrylamide; urethane (meth)acrylates and the bis-(meth)acrylates of polyethylene glycols. Other suitable free radically polymerizable compounds include siloxane functional (meth)acrylates and fluoropolymer functional (meth)acrylates. Mixtures of two or more free radically polymerizable compounds can be used, if desired.

The silica-alumina mixed oxide compositions of the invention have a variety of uses and applications. Some of the contemplated applications are as filler materials for optical and optoelectronic devices, as components of lenses, optical plastics, light guides, light diffusion coatings, clear coats and other transparent articles. Because of the hardness of silica-alumina composites, the scratch resistance and mechanical properties of such articles will be greatly improved. The compositions of the invention are especially useful for light curable resins, since the increased depth of cure at cure rate will enable composite materials of greater thickness.

EXAMPLES

The following examples are provided to illustrate the invention.

Materials

All material concentrations are given as a weight to weight percentage unless otherwise noted. All dispersions are in water unless otherwise noted.

NALCO 2326, 2327 and 2329 are trademarked products of NALCO Chemical Co., Naperville, Ill. NALCO 2326 is a colloidal dispersion of silica in water, with a mean particle size of 5 nm and solids content of 15%. NALCO 2327 is a colloidal dispersion of silica in water; the mean silica particle diameter is 20 nm and the solids concentration 40.0%. NALCO 2329 is a colloidal dispersion of silica in water; the mean silica particle diameter is 75 nm and the solids concentration 40.0%. DISPAL and CATAPAL are trademarked boehmite (AlOOH) products sold by Sasol America. Alumina oxide is a 20.0% dispersion of gamma-aluminum oxide water available from Nanostructured & amorphous materials, Houston, Tex. NANOBYK-3600 is a trademarked product of BYK Chemie.

TABLE 1

Physical properties of silica and alumina nanoparticles and dispersions.

| Commercial Name | Material | primary particle size (nm) | Dispersed Particle size (nm) | Specific surface area ($m^2/g$) | % solids |
|---|---|---|---|---|---|
| NALCO 2326 | silica | 5 | 5 | 600 | 15.0 |
| NALCO 2327 | silica | 20 | 20 | 150 | 20.0 |
| NALCO 2329 | silica | 80 | 80 | 40 | 40.0 |
| Aluminum oxide | $Al_2O_3$ (gamma) | 10 | 10 | 200 | 20.0 |
| NANOBYK-3600 | $Al_2O_3$ | 40-60 | 40 | 40 | 55.0 |
| DISPAL T25N4 | AlOOH | 6.5 | 45 | 250 | 100 |
| DISPAL 18N4-80 | AlOOH | 15 | 50 | 180 | 100 |
| CATAPAL 200 | AlOOH | 40 | 140-200 | 100 | 100 |

Description of Testing Methods

Calculation of Refractive Indices.

Refractive indices ($\eta_{tot}$) were estimated for all compositions using the relationship given in equation 1.

$$\eta_{tot} = (\eta_1 V_1 + \eta_2 V_2)/V_{tot} \quad (1)$$

where $\eta_1$, $\eta_2$ are the refractive indices of the individual components and $V_1$, $V_2$ are the respective volume fractions of that component. The refractive indices used were the reported values; (1.46 for $SiO_2$ and 1.675 for gamma-$Al_2O_3$). The volumes for each phase are calculated based on the weight percentages and densities of the components. (2.2 $g/cm^3$ for $SiO_2$; and 3.66 $g/cm^3$ for $Al_2O_3$).

Optical Measurements.

The refractive index match and relative transparency in dental monomers was determined by making mixtures of the mixed oxide in a monomer of known refractive index at 25 wt %. The monomers were purchased from Sartomer Chemical or Esstech Inc. and are methacrylate monomers commonly used in dental restoratives. The mixtures were sonicated to remove air bubbles, and 2.67 g of the mixtures were added into glass vials to a depth of 5.0 mm. The mixtures were placed on a light box and a series of optical targets were viewed by looking through the thickness of the sample. The mixtures were given a relative transparency score corresponding to the smallest font feature discernable (clearly visible and readable). Font sizes varied from 26-point to 2-point. For example, a rating of 1 indicates that only a 26-point font is readable, a score of 5 refers to readability of 18-point font or larger, 10=8-point and 13=2-point or larger. This simple qualitative method of determining transparency has an estimated accuracy of ±a score of 1. This method of ranking the relative transparency of the mixtures was validated using transmission spectrophotometry. The mixtures described above were measured on a Perkin Elmer Lambda 20 spectrometer at a thickness of 1.5 mm in a borosilicate glass slide cell (empty cell used as reference). The sample was placed as close as possible to the detector. Transparency was determined as the mean % transmission between 500 to 600 nm.

Examples 1-4 demonstrate the assembly and thermal processing of $SiO_2/Al_2O_3$ mixed oxides from large colloidal silica (80 nm) and smaller boehmite particles (6.5 nm basal plane, 45 nm dispersed agglomerate size, 250 $m^2$/g surface area). Example 5 describes an assembly of small colloidal silica (5 nm) and intermediate boehmite particles (15 nm basal plane, 50 nm dispersed agglomerate size, 180 $m^2$/g). Example 6 demonstrates the preparation of median colloidal silica (20 nm) with the intermediate boehmite particles of the previous example. Example 7 describes the small colloidal silica (5 nm) and large boehmite particles (40 nm basal plane, 140 nm dispersed agglomerate size, 100 $m^2$/g). Examples 8, 9, and 10 demonstrate the assembly and thermal processing of $SiO_2/Al_2O_3$ mixed oxides from large colloidal silica (80 nm) and small gamma-alumina (10.0 nm spherical diameter). Example 10 demonstrates that silica-alumina mixed oxides of high transparency can be achieved by simply drying the colloidal aggregate mixtures, at a temperature near 100° C.

Example 1

80/20 wt % $SiO_2/Al_2O_3$

An aqueous dispersion of DISPAL T25N-80 boehmite (Sasol) was prepared by the addition of 150.0 g of solid to 500 ml of deionized water with high shear mixing. Commercially available colloidal silica NALCO 2329 (Nalco) was used without modification.

Into a 750 ml stainless steel vessel, was added 200 ml of deionized water which was stirred with a prop-like mixer at 1000-3000 rpm. To the reaction vessel was then added, simultaneously, 49.43 g of the NALCO 2329 dispersion (20.07 g of $SiO_2$) at a rate of 3.8 ml/min, and 27.06 g of the T25N-80 DISPAL dispersion (5 g $Al_2O_3$) added at a rate of 2.4 ml/min. Addition rates were controlled with calibrated peristaltic pumps. The starting pH was 6.90. A translucent colloid was initially formed that progressed to an opaque, thick material over the addition time. The pH at the end of addition was 5.15. The colloid was collected and dried at 100° C. to give a translucent solid. The material was ground by hand, and sieved through a 100 μm sieve and then fired in a box furnace to 950° C. (1.7 C/min, 3 hour hold). The fired material was resieved through a 100 μm sieve.

Example 2

70/30 wt % $SiO_2/Al_2O_3$

Example 2 was prepared identically as Example 1, with the exception that 46.54 g of the DISPAL T25N4-80 dispersion was delivered at 4.1 mL/min to the reaction vessel containing 230 ml of deionized water. The pH at the end of addition was 3.76.

Example 3

60/40 wt % $SiO_2/Al_2O_3$

Example 3 was prepared identically as Example 1, with the exception that 72.4 g of the DISPAL T25N4-80 dispersion as delivered at 6.3 ml/min to the reaction vessel contained 265 ml water. The pH at the end of addition was 3.1.

Example 4

50/50 wt % $SiO_2/Al_2O_3$

Example 4 was prepared identically as Example 1, with the exception that 108.6 g of the DISPAL T25N4-80 dispersion delivered at 9.5 ml/min to the reaction vessel contained 315 ml water. The pH at the end of the addition was 3.1.

Example 5

50/50 wt % $SiO_2/Al_2O_3$

An aqueous dispersion of DISPAL 18N4-80 boehmite (Sasol) was prepared by the addition of 150.0 g of solid to 500 ml of deionized water with high shear mixing. Commercially available colloidal silica NALCO 2326 (Nalco) was used without modification.

248 ml of deionized water was added to a 750 ml stainless steel vessel and stirred with a prop-like mixer at 1000-3000 rpm. Simultaneously, 123.12 g of the NALCO 2326 solution (20.07 g of $SiO_2$) was added at 11.1 ml/min, and 108.60 g of the 18N4-80 DISPAL dispersion (20.07 g $Al_2O_3$) added at 9.2 mL/min, to the reaction vessel. Addition rates were controlled with calibrated peristaltic pumps. The starting pH was 6.50. A translucent colloid was initially formed that progressed to an opaque, thick material over the addition time. The pH at the end of the addition was 8.45.

The colloid was collected and dried at 100° C. to give a translucent solid. The material was ground by hand, and sieved through a 100 μm sieve and then fired in a box furnace to 950° C. (1.7 C/min, 3 hour hold). The fired material was resieved through a 100 μm sieve.

Example 6

50/50 wt % $SiO_2/Al_2O_3$

An aqueous dispersion of DISPAL 18N4-80 boehmite (Sasol) was prepared by the addition of 150.0 g of solid to 500 ml of deionized water with high shear mixing. Commercially available colloidal silica NALCO 2327 (Nalco) was used without modification.

1400 ml of deionized water was added to a 4L stainless steel vessel and stirred with a proprietary mixer at 2500-3500 rpm. Simultaneously, 167.53 g of the NALCO 2327 solution (68.52 g of $SiO_2$) was added at 11.3 mL/min, and 307.71 g of the 18N4-80 DISPAL dispersion (68.52 g $Al_2O_3$) added at 20.7 mL/min, to the reaction vessel. Addition rates were controlled with calibrated peristaltic pumps. The starting pH was 5.55. A translucent colloid was initially formed that increased slightly in viscosity over the addition time. The pH at the end of the addition was 7.58.

The colloid was collected and dried at 100° C. to give a translucent solid. The material was ground by hand and then ball milled with ⅜ inch alumina media for 18 hours. The milled powder was separated from the media and passed through a 100 μm sieve and then fired in a box furnace to 950° C. (1.7 C/min, 3 hour hold). The fired material was resieved through a 100 μm screen.

Example 7

50/50 wt % $SiO_2/Al_2O_3$

An aqueous dispersion of CATAPAL 200 boehmite (Sasol) was prepared by the addition of 150.0 g of solid to 500 ml of deionized water with high shear mixing. Commercially available colloidal silica NALCO 2326 (Nalco) was used without modification.

249 ml of deionized water was added to a 750 stainless steel vessel and stirred with a prop-like mixer at 1700-2700 rpm. Simultaneously, 123.12 g of the NALCO 2326 solution (20.07 g of $SiO_2$) was added at 11.1 ml/min, and 106.53 g of the CATAPAL 200 dispersion (20.07 g $Al_2O_3$) added at 9.0 ml/min, to the reaction vessel. Addition rates were controlled with calibrated peristaltic pumps. The starting pH was 6.40. An opaque colloid was initially formed that increased in viscosity over the addition time. The pH at the end of addition was 8.74.

The colloid was collected and dried at 100° C. to give an opaque solid. The material was ground by hand to pass a 100 μm sieve and then fired in a box furnace to 950° C. (1.7 C/min, 3 hour hold). The fired material was resieved to pass 100 p.m.

Example 8

70/30 wt % $SiO_2/Al_2O_3$

Into a 750 ml stainless steel vessel was added 200 ml of deionized water that was stirred with a prop-like mixer at 3000 rpm. To this reaction vessel was added, simultaneously, 50.18 g of a NALCO 2329 dispersion (20.07 g of $SiO_2$) at a rate of 4 mL/min, and 77 g of a 10 nm aluminum oxide dispersion (11.12 wt %) a rate of 7.7 ml/min. Addition rates were controlled with calibrated peristaltic pumps. A translucent colloid was initially formed that progressed to a turbid material over the addition time. The pH was held between 5.1 to 5.4 through the addition. The colloid was collected and dried at 100° C. to give an opaque solid. The material was ground by hand, and sieved through a 100 μm sieve and then fired in a box furnace to temperatures from 950° C. (1.7 C/min, 3 hour hold). The fired material was resieved through a 100 μm sieve.

Example 9

50/50 wt % $SiO_2/Al_2O_3$

Into a 750 ml stainless steel vessel was added 96.5 g of a 10 nm aluminum oxide dispersion (20.8 wt %) that was diluted with the addition of 100 ml of distilled water. To this reaction vessel was added 50.18 g of a NALCO 2329 dispersion (20.07 g of $SiO_2$) at a rate of 10 ml/min with agitation using a prop-like mixer. The addition rate was controlled with calibrated peristaltic pumps. A translucent colloid was initially formed that progressed to a slightly opaque material over the addition time. The pH was held between 3.6 to 3.8 through the addition. The colloid was collected and dried at 100° C. to give an opaque solid. The material was ground by hand, and sieved through a 100 μm sieve and then fired in a box furnace at 950° C. (1.7 C/min, 3 hour hold). The fired material was resieved through a 100 μm sieve. The calculated index was 1.541.

Comparison Example C1

40 nm Alumina—70/30 wt % $SiO_2/Al_2O_3$ 16.68 g of a NanoBYK-3600 aqueous 40 nm alumina dispersion (51.75 wt %) was diluted with 50 g of distilled water. Into a 750 ml stainless steel vessel, was added 150 ml of deionized water that was stirred with a prop-like mixer at 2000 rpm. To this reaction vessel was added, simultaneously, 125.1 g of NALCO 2326 dispersion (20.07 g of $SiO_2$) at a rate of 11.4 ml/min, and the NanoBYK 3600 dispersion a rate of 7.1 ml/min. Addition rates were controlled with calibrated peristaltic pumps. A translucent colloid was initially formed that progressed to an opaque material over the addition time. The pH was held to 8.3 through the addition. The colloid was collected and dried at 100° C. to give an opaque solid. The material was ground by hand, and sieved through a 100 μm sieve and then fired in a box furnace to 950° C. (1.7 C/min, 3 hour hold). The fired material was resieved through a 100 μm sieve. The calculated index of refraction was 1.504.

Comparative Example C2

Commercial Index Matched Glass

A 0.7 μm commercial barium borosilicate glass coated with 3% silane (Esstech, Inc.) was mixed with SR101 monomer (Sartomer) at 25 wt % for transparency comparison. The refractive index of the barium glass was reported to be 1.54.

The data of Table 1 shows that the examples of the invention may exhibit extremely high transparencies when dispersed within a resin of approximately the same refractive index. The percent transmission of visible light is in excess of 75% at a loading of 25 wt % particles. The comparison example, in contrast, shows a transparency score of 10 and a percent transmission of only 33.1%. When the primary particle diameter of the alumina colloid used to prepare the mixed oxide is greater than about 40 nm (example 7), the transparency is diminished as is observed by the transparency score and percent transmission.

Comparative Example C3

Silica-Zirconia Oxide

Into a 2.0 L stainless steel reactor containing 300.0 g distilled water stirred with a prop-like mixer spinning at 2000 rpm, was simultaneously added: 640.0 g of colloidal silica (NALCO 1060; 50.0% silica solids) at a rate of 20.0 g/min and 533.3 g of a 5-10 nm zirconia colloid (Nyacol Nanotechnologies, 20.0% zirconia solids) at a rate of 16.7 g/min. Throughout addition, 0.1 N acetic acid was added at a rate to keep the pH of the mixture between 4.0-4.4. Addition rates were controlled with peristaltic pumps that were precalibrated to control to within about ±0.1 g/min. After addition, the reaction mixture was allowed to stir for 1 hour. The suspension was then allowed to stand for 48 hours, after which time the mixture was translucent without any visible settling. After preparation, the product was dried in a forced air oven at 100° C., the solid obtained was milled with 9 mm alumina beads for 16 hours and the resulting fine powder was fired in a programmable furnace at 950° C. for 3 hours and allowed to cool. The white powder obtained was then sieved through a 100 micron nylon screen to remove any large particles.

TABLE 2

Transparency scores and % transmission for examples and comparison examples.

| Example | Wt % silica | Wt % alumina | primary particle size alumina or boehmite* | Calc. Refractive index | fluid refractive index | Transparency Score | % T (UV-Vis) |
|---|---|---|---|---|---|---|---|
| 1 | 80 | 20 | 6.5 | 1.488 | 1.489 | >13 | 91.7 |
| 2 | 70 | 30 | 6.5 | 1.504 | 1.503 | 13 | 75.3 |
| 3 | 60 | 40 | 6.5 | 1.522 | 1.523 | 13 | 83.0 |
| 4 | 50 | 50 | 6.5 | 1.541 | 1.542 | 12.5 | 57.5 |
| 5 | 50 | 50 | 15 | 1.541 | 1.542 | 10 | 28.2 |
| 6 | 50 | 50 | 15 | 1.541 | 1.542 | 12.5 | 57.0 |
| 7 | 50 | 50 | 40 | 1.541 | 1.542 | 7 | 9.9 |
| 8 | 70 | 30 | 10 | 1.504 | 1.503 | 14 | n.m. |
| 9 | 50 | 50 | 10 | 1.541 | 1.537 | 14 | n.m. |
| C1 | 70 | 30 | 40-60 | 1.504 | 1.503 | 2 | n.m. |
| C2 | Na | na | Na | 1.54 | 1.542 | 10 | 33.1 |
| C3 | Na | na | Na | 1.537 | 1.537 | 9 | n.m. | n.m. = not measured.
*boehmite particles are monolithic in morphology; the primary particle diameter indicates the average crystallite size.

Example 10

A silica-alumina identical mixed colloid identical to that described in example 8 was dried at 100° C. and thermally processed at various temperatures. The transparency score was then determined at each temperature and the data are shown in Table 3.

TABLE 3

Transparency scores for a silica-alumina mixed oxide dried and processed at various temperatures.

| Example | Wt % silica | Wt % alumina | primary particle size alumina | Calc. Refractive index | fluid refractive index | Drying or Processing temperature (° C.) | Transparency Score |
|---|---|---|---|---|---|---|---|
| 10 | 70 | 30 | 10 | 1.504 | 1.503 | 100 | 12 |
|  | 70 | 30 | 10 | 1.504 | 1.503 | 550 | 12 |
|  | 70 | 30 | 10 | 1.504 | 1.503 | 950 | 14 |
|  | 70 | 30 | 10 | 1.504 | 1.503 | 1025 | 14 |
|  | 70 | 30 | 10 | 1.504 | 1.503 | 1075 | 13.5 |
|  | 70 | 30 | 10 | 1.504 | 1.503 | 1125 | 13.5 |

The data of Table 3 show that the silica-alumina mixed oxides of the invention have high transparencies over a wide range of processing temperatures. Most surprisingly, the transparency is high even at drying temperature as low as 100° C. This is significant since it greatly lowers the energy demand and production costs for producing index matched mixed oxides.

The invention claimed is:

1. A composition comprising a hetero-coagulated silica-alumina mixed oxide particle comprising at least one silica colloid and at least one alumina or alumina precursor, wherein the alumina or alumina precursor has an average mean primary particle diameter of less than 50 nm, and wherein said hetero-coagulated silica-alumina mixed oxide particle has an index of refraction between 1.46 and 1.60, and a high transparency when dispersed in a fluid of substantially the same refractive index.

2. The composition of claim 1 wherein the silica colloid has a mean particle diameter of not more than 200 nm.

3. The composition of claim 1 wherein the alumina or alumina precursor has an average mean particle diameter of less than 25 nm.

4. The composition of claim 1 wherein the alumina precursor is boehmite.

5. The composition of claim 4 wherein the boehmite has a mean primary particle diameter of less than 50 nm.

6. The composition of claim 4 wherein the boehmite has a mean primary particle diameter of less than 25 nm.

7. The composition of claim 1 wherein the hetero-coagulated silica-alumina mixed oxide particle has a refractive index between 1.48 and 1.55.

8. The composition of claim 1 wherein the hetero-coagulated silica-alumina mixed oxide particle has a mean particle diameter of less than 10 microns.

9. The composition of claim 1 wherein the hetero-coagulated silica-alumina mixed oxide particle has a mean particle diameter of less than 2 microns.

10. The composition of claim 1 wherein the hetero-coagulated silica-alumina mixed oxide particle is functionalized with a surface agent to produce surface functionalized particles.

11. The composition of claim 10 wherein the surface agent comprises silane coupling agents, or hydrolyzed precursors of silane coupling agents having the general formula:

$$R_a R'_b Si(OR'')_{4-(a+b)},$$

where a and b are integers from 1 to 3;

(a+b) is less than or equal to 3;

R and R' are organic groups having from 1-30 carbon atoms; and

R" is H, or an organic group having from 1 to 6 carbon atoms.

12. The composition of claim 10 wherein the surface agent comprises silane coupling agents, or hydrolyzed precursors of silane coupling agents having the general formula:

$$RaSi(X)4-a,$$

where a is an integer from 1 to 3;

R is an organic group having from 1-30 carbon atoms; and

X is a halogen, Cl, Br or I.

13. A composition comprising a hetero-coagulated silica-alumina mixed oxide particle comprising at least one silica colloid and at least one alumina or alumina precursor, wherein the alumina or alumina precursor has an average mean primary particle diameter of less than 50 nm, dispersed within a matrix, and wherein said hetero-coagulated silica-alumina mixed oxide particle has an index of refraction between 1.46 and 1.60, and a high transparency when dispersed in a fluid of substantially the same refractive index.

14. The composition of claim 1 wherein the visible light transmission of a 1.5 millimeter thickness is greater than 40.0%, when the composition is dispersed within a fluid of substantially the same refractive index at a volume fraction of at least 25%.

15. The composition of claim 1 wherein the visible light transmission of a 1.5 millimeter thickness is greater than 70.0%, when the composition is dispersed within a fluid of substantially the same refractive index at a volume fraction of at least 25%.

16. A method of making a hetero-coagulated silica-alumina mixed oxide particle comprising:

a. simultaneously adding at least one silica colloid to at least one alumina or alumina precursor, wherein the alumina or alumina precursor has an average mean primary particle diameter of less than 50 nm, in a high shear mixing zone.

17. The method of claim 16 further comprising:

b. drying the hetero-coagulated silica-alumina mixed oxide particle to obtain a powder; and c. thermally treating the dried powder.

18. The method of claim 17 wherein thermally treating the silica-alumina mixed oxide particle is accomplished at a temperature below 125° C.

19. The method of claim 17 wherein thermally treating the silica-alumina mixed oxide particle is accomplished at a temperature below 300° C.

20. The composition of claim 1 wherein the alumina or alumina precursor has an average mean primary particle diameter of less than 40 nm.

21. The composition of claim 13 wherein the alumina or alumina precursor has an average mean primary particle diameter of less than 40 nm.

* * * * *